(12) United States Patent
Moruzzi

(10) Patent No.: US 7,305,746 B2
(45) Date of Patent: Dec. 11, 2007

(54) SYSTEM FOR REMOVING HEAT TRANSFER FINS FROM, AND BEVELING THE ENDS OF, BOILER TUBES

(75) Inventor: James Moruzzi, Sherborn, MA (US)

(73) Assignee: Esco Tool, Medfield, MA (US)

( * ) Notice: Subject to any disclaimer, the term of this patent is extended or adjusted under 35 U.S.C. 154(b) by 0 days.

(21) Appl. No.: 11/599,781

(22) Filed: Nov. 15, 2006

(65) Prior Publication Data

US 2007/0122246 A1    May 31, 2007

Related U.S. Application Data

(63) Continuation-in-part of application No. 11/377,839, filed on Mar. 16, 2006.

(60) Provisional application No. 60/736,895, filed on Nov. 15, 2005.

(51) Int. Cl.
*B23P 23/00* (2006.01)

(52) U.S. Cl. .......................... 29/50; 29/890.31; 408/82; 408/204; 408/206; 408/224; 409/138; 409/192

(58) Field of Classification Search ........... 29/890.031, 29/566, 566.1, 50; 408/80, 82, 79, 201, 204, 408/207, 209, 703, 223–225, 206; 82/128, 82/113; 30/93–99; 409/138, 232, 234, 178, 409/179, 192, 203, 213, 217

See application file for complete search history.

(56) References Cited

U.S. PATENT DOCUMENTS

| | | | | | |
|---|---|---|---|---|---|
| 3,532,010 | A | * | 10/1970 | Klintworth | 408/201 |
| 4,691,600 | A | * | 9/1987 | Carlson et al. | 82/113 |
| 5,044,075 | A | * | 9/1991 | Brennan et al. | 29/890.031 |
| 5,171,111 | A | * | 12/1992 | Kishimoto | 408/201 |
| 5,542,177 | A | * | 8/1996 | Hillestad | 29/890.03 |
| 5,741,097 | A | * | 4/1998 | Murphy, II | 408/201 |
| 7,143,673 | B2 | * | 12/2006 | Hall | 82/113 |
| 2006/0254040 | A1 | * | 11/2006 | Moruzzi | 29/270 |
| 2007/0098509 | A1 | * | 5/2007 | Hall | 409/138 |

* cited by examiner

*Primary Examiner*—Erica Cadugan
(74) *Attorney, Agent, or Firm*—Devine, Millimet & Branch; Paul C. Remus; Raymond I. Bruttomesso, Jr.

(57) ABSTRACT

A system is disclosed to use a first rotary milling head to break or cut the bond of a heat transfer fin base to a boiler tube, thereby removing the heat transfer fins from the boiler tube, and a second rotary milling head to bevel the exposed end of the boiler tube, thereby facilitating the more efficient repair of the boiler tube.

5 Claims, 6 Drawing Sheets

SYSTEM FOR REMOVING HEAT TRANSFER FINS FROM, AND BEVELING THE ENDS OF, BOILER TUBES

CROSS-REFERENCE TO RELATED APPLICATIONS

The present application claims the benefit of provisional patent application Ser. No. 60/736,895 filed Nov. 15, 2005, which is incorporated herein by reference and is a continuation in part of patent application Ser. No. 11/377,839 filed Mar. 16, 2006.

TECHNICAL FIELD

This invention relates to the repair of boiler tubes. More specifically, it relates to a system for removing heat transfer fins from a section of boiler tube and for preparing the tube end to facilitate the repair of the boiler tube.

BACKGROUND OF THE INVENTION

Steam-generating boilers are generally large structures containing numerous boiler tubes, usually made of steel, that are in thermal contact with a burning fuel, such as coal. The burning fuel heats water circulating through the boiler tubes. The heated water, or more usually the resulting steam, is used to drive turbines for generation of electricity or other purposes. In order to facilitate thermal transfer to the water in a boiler tube, heat transfer fins are placed around the boiler tube. They are typically brazed or welded to the boiler tube by high frequency welding. Because of deterioration due to corrosion and the like, boiler tubes may require replacement. Ordinarily repair of a damaged boiler tube involves cutting and removal of the damaged section of the tube and replacement with a new section. The section of boiler tube to be replaced is generally cut out using a power saw or cutting torch. However, heat transfer fins on the boiler tube must first be removed to gain access to the boiler tube. Removal of the heat transfer fins from the boiler tube has, before the present invention, been done with portable power tools such as a grinding tool having a rotary abrasive wheel or with air chisels. These techniques are at best time consuming.

In addition, after removal of the damaged section of boiler tube, it may be necessary to remove heat transfer fins at or near the end of the remaining tube ends and to prepare the tube ends for welding to a new section of boiler tube. Proper preparation of the exposed tube ends requires beveling of the exposed tube ends for a good weld. More specifically, the exposed tube ends should have a frustoconical bevel to facilitate a good weld. It is highly desirable that this be done as quickly as possible.

It is, therefor, an object of the present invention to remove heat transfer fins from boiler tubes, more quickly and efficiently, and at the same time to bevel the exposed tube ends.

SUMMARY OF THE INVENTION

The present invention is a system for breaking or cutting the bonds holding a heat transfer fin base to a boiler tube and for concurrently beveling the exposed end of the boiler tube. It includes a first rotary milling head that has a cutting tip that traverses a circular path slightly larger than the outer diameter of the boiler tube. The cutting tip extends between adjacent windings of the heat transfer fin base. As the first rotary milling head is rotated, the cutting tip cuts or breaks the bonds of the heat transfer fin base by exerting forces both in the direction of rotation of the first rotary milling head and in the direction toward the first rotary milling head. It also includes a second rotary milling head that bevel the exposed end of the boiler tube. The rotary milling heads are guided and stabilized by a mandrel that fits on the inside of the boiler tube.

BRIEF DESCRIPTION OF THE DRAWINGS

These and other features and advantages of the present invention will be better understood by reading the following detailed description, taken together with the drawings wherein preferred embodiments as shown as follows.

DETAILED DESCRIPTION OF THE INVENTION

Figure 1:
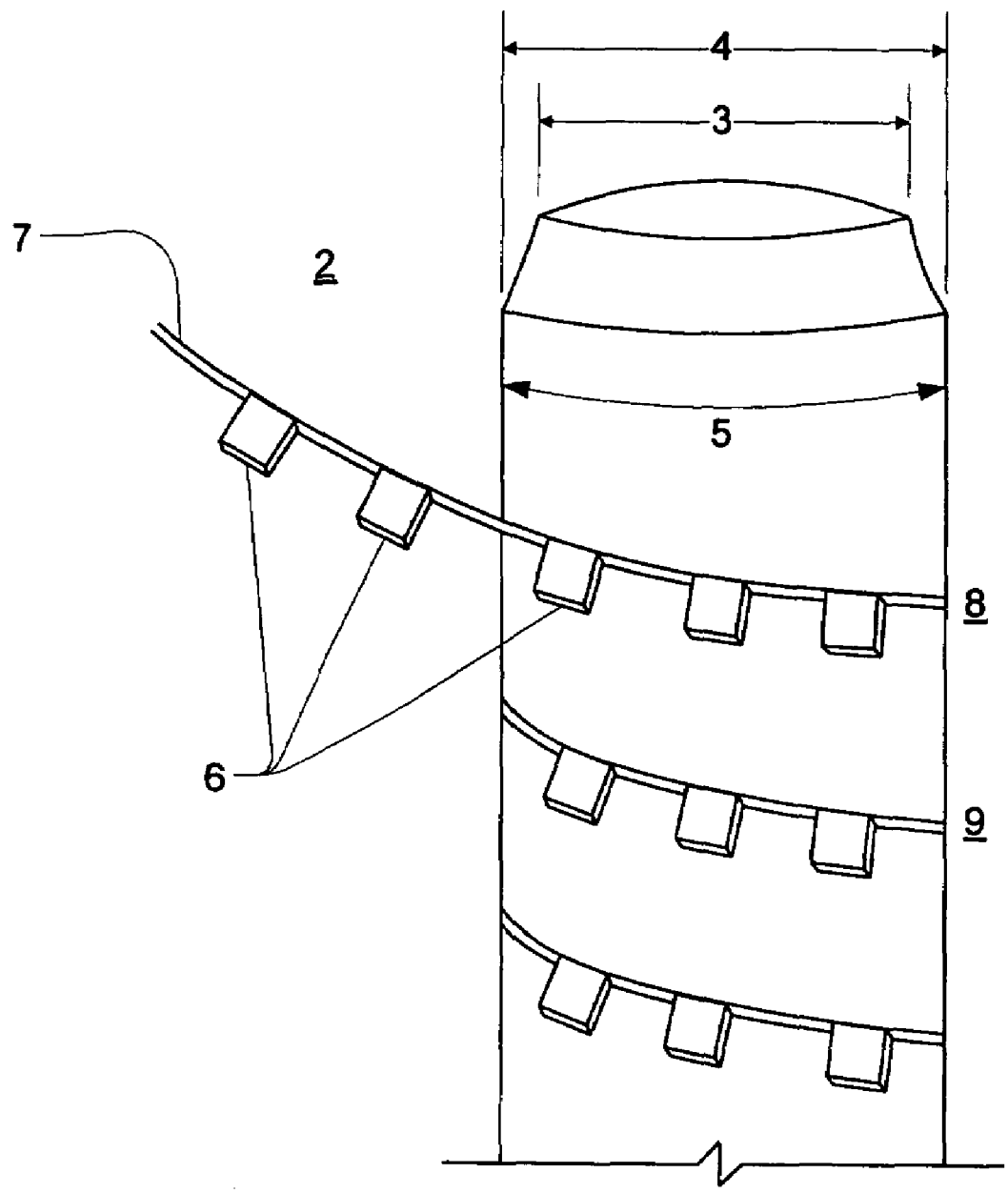
FIG. 1 is a schematic diagram of a heat transfer base as it is wound around a boiler tube.

FIG. 1 shows a boiler tube 2 with inner diameter 3, an outer diameter 4 and a circumference 5. Heat transfer fins 6 are attached to a heat transfer fin base 7 that is wound around the tube 2 in a corkscrew fashion. The base 7 is then bonded to the boiler tube, typically by brazing or welding. Thus, one winding 8 of the base 7 is adjacent to another winding 9 of the base 7.

Figure 2:
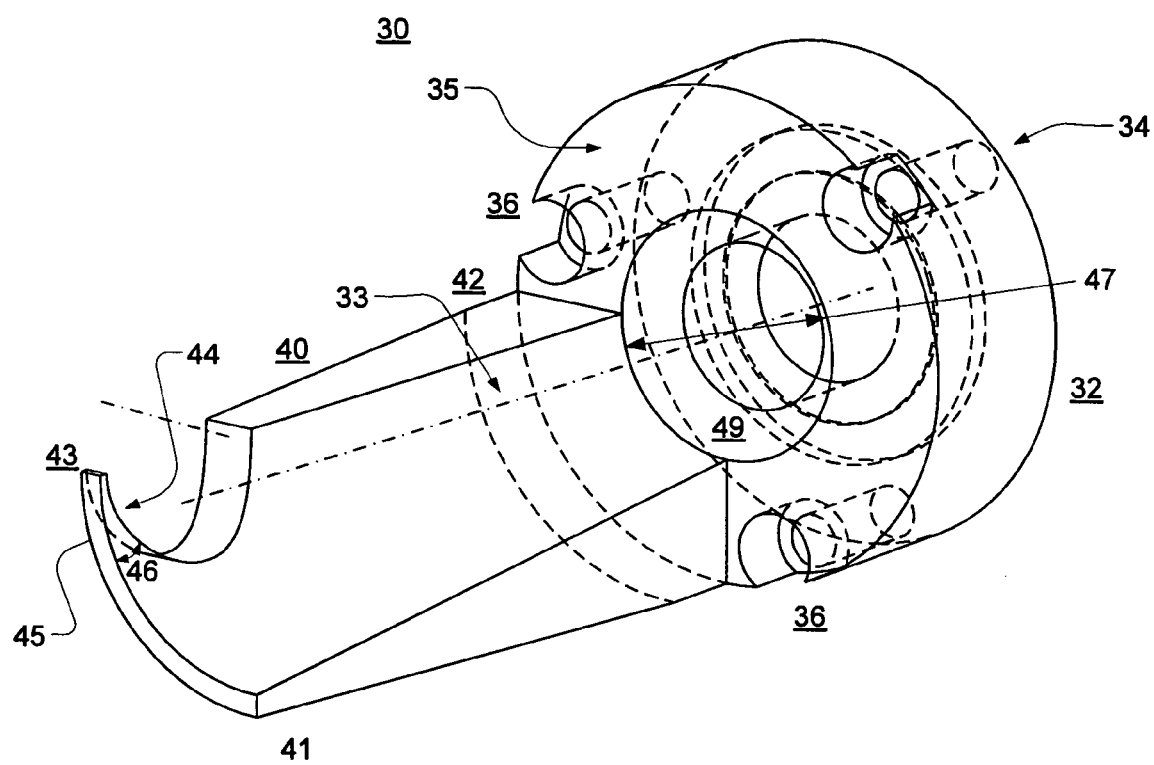
FIG. 2 is a schematic diagram of the first rotary milling head of the present invention.
Figure 3:
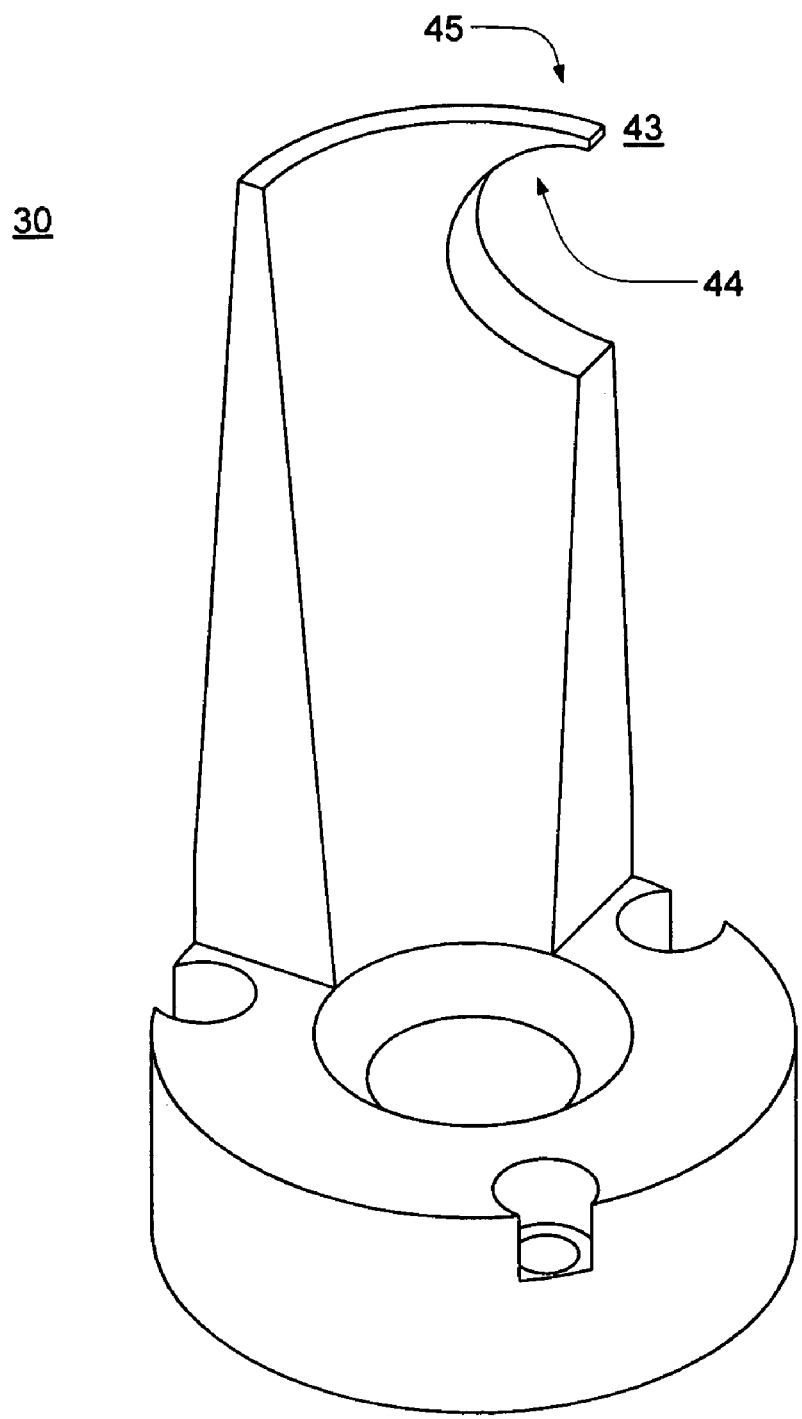
FIG. 3 is a diagram of another view of the first rotary milling head of the present invention.

The present invention includes a system for removing the heat transfer fins from the boiler tube 2 by cutting or breaking the bonds holding the heat transfer fin base 7 to the boiler tube 2. As shown in FIG. 2 and 3, a preferred embodiment of the first rotary milling head 30 of the present invention includes a first milling head base 32 rotatable around a center of rotation 33 extending through a first side 34 and a second side 35 with the first side 34 adapted to be connected to a second rotary milling head described below. This embodiment has three holes 37 extending through the first side 34 and the second side 35 to allow it to be attached to the second rotary milling head.

A cutting tool 40 has a cutting end 41 and a mounting end 42 with the mounting end 42 attached to the second side 35 of the first milling head base 32. The cutting end 41 of the cutting tool 40 is attached to a cutting tip 43 that comprises an upper cutting surface 44 and a lower cutting surface 45 that intersect at a cutting angle 46. The cutting tip 43 is oriented to move in the direction of rotation of the first milling head base 32.

The mounting end 42 of the cutting tool 40 is attached to the second side 35 of the first milling head base 32 a distance from the center of rotation 33 of the first milling head base 32 such that the cutting tip 43 traverse a circular path whose diameter 47 is slightly larger than the outside diameter 4 of a boiler tube 2 when the first milling head base 32 is rotated. The first milling head base 32 also has a hole 49 of diameter 47, which is slightly larger than the outside diameter 4 of a boiler tube 2, extending through the first milling head base 32 from the first side 34 through the second side 35. It is to be understood that both the means for attaching mounting end 42 of the cutting tool 40 to the second side 35 of the first milling head base 32 and the means for attaching the cutting end 41 of the cutting tool 40 to the cutting tip 43 include manufacturing cutting tip 43, the cutting tool 40, and the first milling head base 32 out of one piece of metal, as well as other means known to those skilled in the art.

Figure 5:
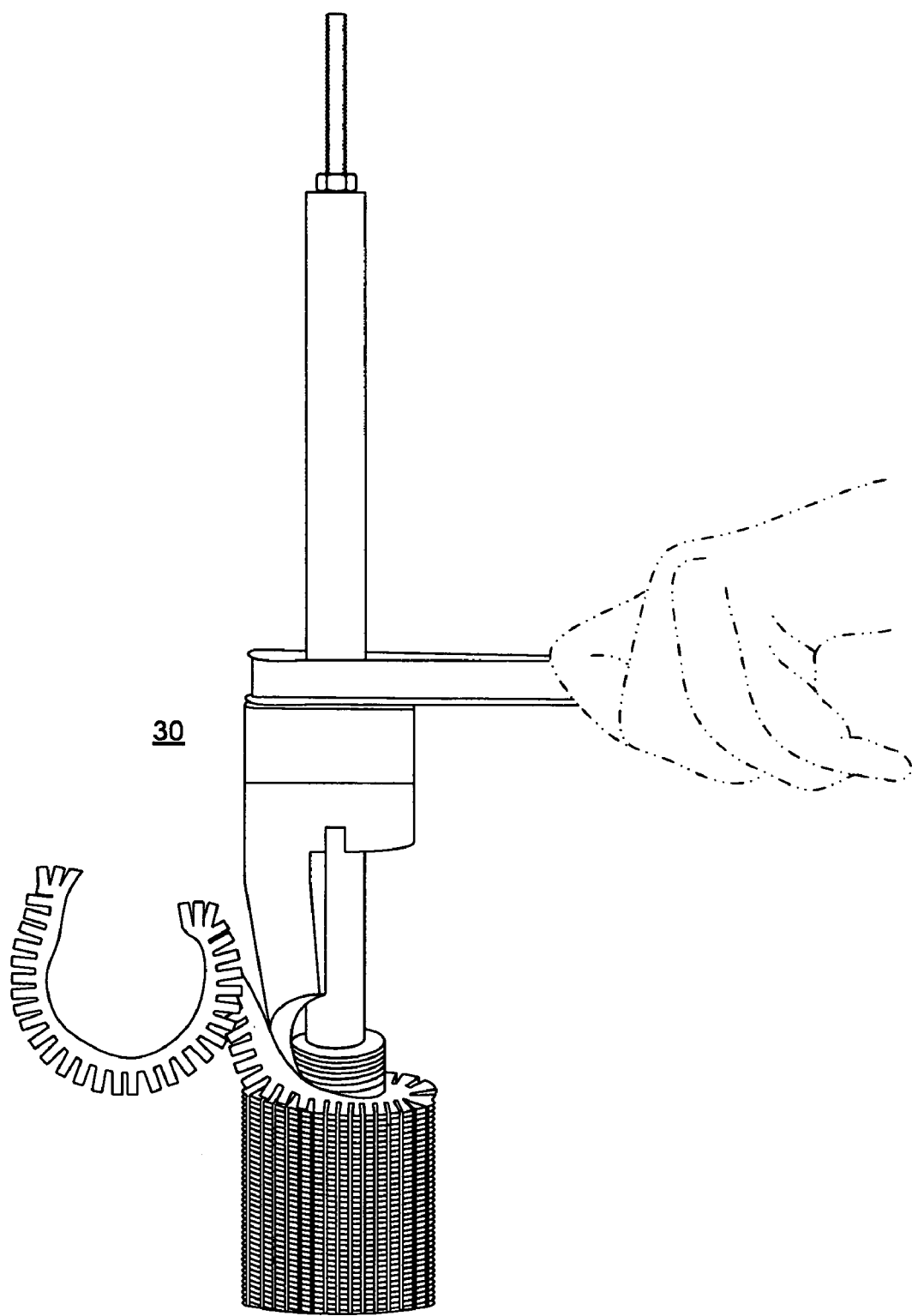
FIG. 5 is a diagram of the first rotary milling head of the present invention with a manual means of rotation.

Also, as shown in FIGS. 2, 3 and 5, in operation, another preferred embodiment of the present invention, has a cutting tip 43 that extends between adjacent windings 8, 9 of the heat transfer fin base 7. The bond of the base 7 to the boiler tube 2 in one of the windings 8, 9 is cut or broken by forces exerted by the cutting tip 43 both in the direction of rotation of the first milling head base 32 and in the direction toward the first milling head base 32 as the cutting tool 40 is rotated around the boiler tube 2. In this preferred embodiment, the cutting angle 46 formed by the upper cutting surface 44 and the lower cutting surface 45 of the cutting tip 43 is chosen based on the spacing of the rows 8, 9 of the heat transfer fin base 7. The cutting tip 43 may be constructed of S7 steel or other steels known to those skilled in the art.

Further, as shown in FIG. 5, in operation, the cutting tool 40 is rotated around the boiler tube 2 and the cutting tip 43 breaks or cuts the bond of the heat transfer fin base 7 to the boiler tube 2. The cutting tool 40 can be rotated manually as shown in FIG. 5 or through the use of other means of rotation, including an electric or pneumatic power tool. In another preferred embodiment of the present invention, the cutting angle 46 is such that it causes the cutting tip 43 to advance or self-feed as the cutting tool 40 is rotated around the boiler tube 2. In another embodiment, gravity may be utilized to cause such an advance.

Figure 4:
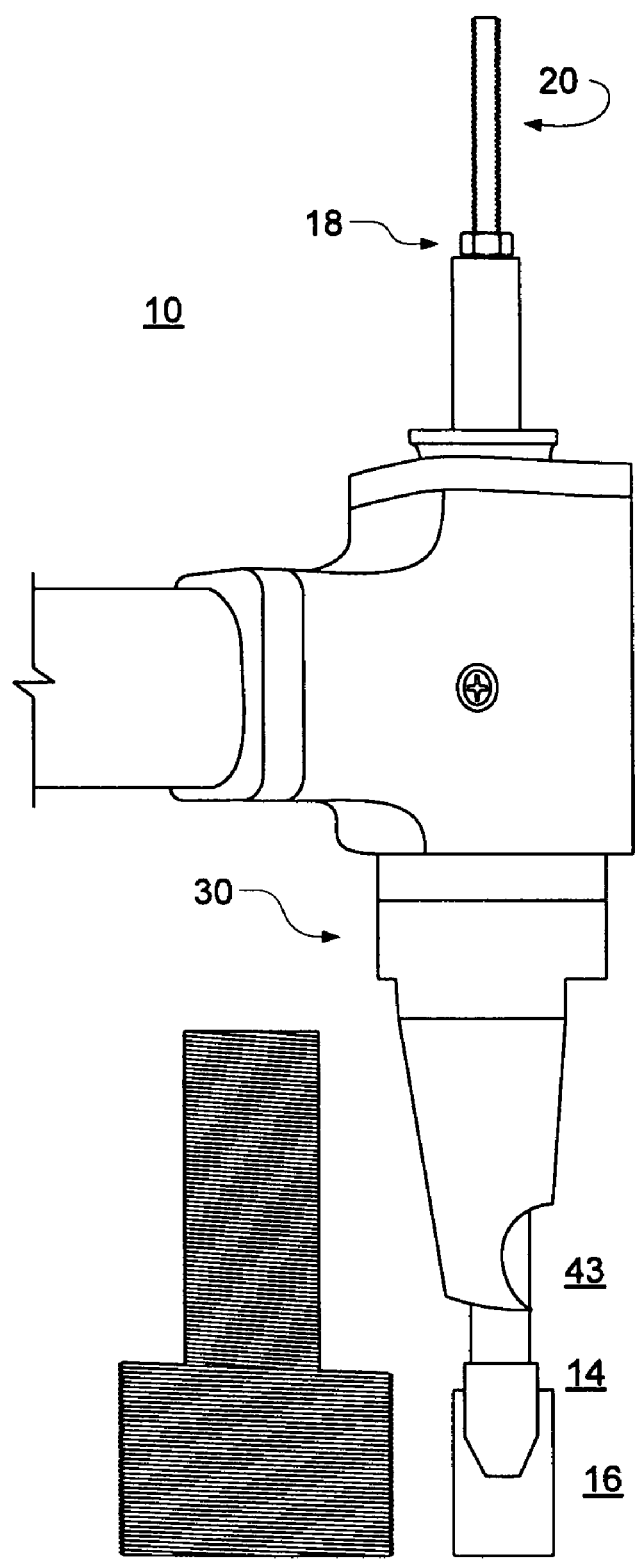
FIG. 4 is a diagram of the first rotary milling head of the present invention with a pneumatic means of rotation.

In another embodiment of the present invention, as shown in FIG. 4, a power tool 10 is used to rotate the rotary milling head 30. The power tool 10 also has a means to guide and stabilize the first rotary milling head 30, which in this embodiment is a mandrel 14, but which may be other means known to those skilled in the art. The mandrel 14 fits on the inside of the boiler tube 2 to guide and stabilize the first rotary milling head 30 during operation. The mandrel 14 has three clamp fingers 16 to lock against the inner diameter 3 of the boiler tube. The clamp fingers 16 are extended by turning the nut 18 on an extension of the mandrel 20 extending out of the back of the power tool 10. In yet another embodiment of the present invention, the cutting tip 43 can be advanced by a feed mechanism, not here shown but known to those skilled in the art, on the extension of the mandrel 20.

Figure 6:
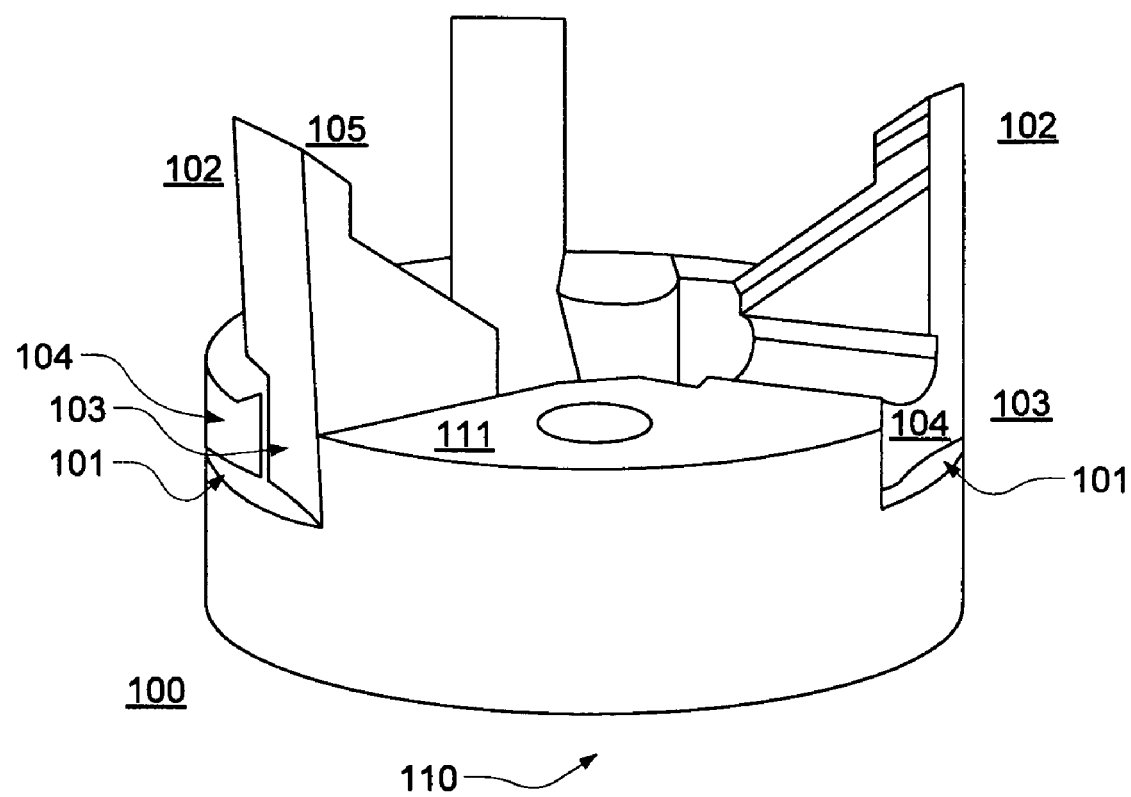
FIG. 6 is a schematic diagram of the second rotary milling head of the present invention.

A second rotary milling head 100 of one embodiment of the present invention is shown in FIG. 6. The second rotary milling head has a first side 110 and a second side 111 and is used to form a frustoconical bevel on the end of the tube 2. The second rotary milling head 100 has a plurality of openings 101 on the second side 111 to receive cutting blades 102. Each cutting blade 102 has a securing portion 103 that fits into opening 101 and is secured therein by securing element 104. The first side 110 of the second rotary milling head 100 is mounted coaxially with the mandrel 14 to the output shaft of the power tool 10. There are a number of different methods known to those skilled in the art for mounting the first side 110 of the second rotary milling head to 100 to the output shaft of the power tool 10, including tool chucks.

In this embodiment, the first side 34 of the first rotary milling head 12 is then attached to the second side 111 of the second rotary milling head 100 by any one of a number of means known to those skilled in the art including using bolts from the second rotary milling head extending through the holes 37 in the first rotary milling head 12 so that the tube 2 extends through the hole 49 in the first milling head base 32. While the first rotary milling head 12 is removing the heat transfer fin 6, the second rotary milling head 100 is concurrently beveling the end of tube 2. The desired length of fin removal is determined by the length of the first cutting head 12.

The cutting blades 102 in the second rotary milling head 100 have cutting edges 105 that are angled at an approximate angle for producing the desired frustoconical bevel on the end of tube 2. The first rotary milling head 12 and second rotary milling head 100 are advanced or retracted by the feed mechanism of the present invention.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A system to cut or break a bond of a heat transfer fin base to a boiler tube and to bevel an end of the boiler tube, comprising a first rotary milling head with a first milling head base, having a hole of a diameter larger than the diameter of the boiler tube extending through a first side and second side of the first milling head base, which first milling head base is rotatable around a center of rotation that is the center of the hole extending through the first side and the second side, with the first side adapted to be connected to a second rotary milling head;

a cutting tool with a cutting end and a mounting end;

a cutting tip attached to the cutting end that comprises an upper cutting surface and a lower cutting surface that intersect at a cutting angle and that is oriented to move in the direction of rotation of the milling head base;

a means to attach the mounting end to the second side of the first milling head base a distance from the center of rotation such that the cutting tip traverses a circular path whose diameter is slightly larger than an outside diameter of the boiler tube when the first milling head base is rotated, thereby causing the cutting tip to exert forces on the heat transfer fin base in the direction of rotation of the cutting tip and in the direction toward the first milling head base;

a second rotary milling head having a first side and a second side with the first side adapted to be connected to a means of rotation and the second side having a plurality openings;

a plurality of cutting blades, each with a securing portion to fit into an opening;

securing means to secure the securing portion of a cutting blade into an opening; and a means to attach the first side of the first milling head base to the second side of the second rotary milling head so that the boiler tube end extends through the hole in the first milling head base to the second side of the second rotary milling head.

2. The rotary milling head of claim 1 wherein the cutting angle is such that the cutting tip self-feeds as it advances to cut or break the bond of the heat transfer fin base.

3. A system to cut or break a bond of a heat transfer fin base to a boiler tube and to bevel an end of the boiler tube, comprising

- a first rotary milling head with a first milling head base, having a hole of a diameter larger than the diameter of the boiler tube extending through a first side and second side of the first milling head base, which first milling head base is rotatable around a center of rotation that is the center of the hole extending through the first side and the second side, with the first side adapted to be connected to a second rotary milling head;
- a cutting tool with a cutting end and a mounting end;
- a cutting tip attached to the cutting end that comprises an upper cutting surface and a lower cutting surface that intersect at a cutting angle and that is oriented to move in the direction of rotation of the milling head base;
- a means to attach the mounting end to the second side of the first milling head base a distance from the center of rotation such that the cutting tip traverses a circular path whose diameter is slightly larger than an outside diameter of the boiler tube when the first milling head base is rotated, thereby causing the cutting tip to exert forces on the heat transfer fin base in the direction of rotation of the cutting tip and in the direction toward the first milling head base;
- a second rotary milling head having a first side and a second side with the first side adapted to be connected to a means of rotation and the second side having a plurality openings;
- a means of rotation for rotating the second rotary milling head;
- a means for attaching the first side of the second rotary milling head to the means of rotation;
- a stabilizing means attached to the means of rotation to be inserted in the boiler tube to guide and stabilize the first rotary milling head and second rotary milling head;
- a plurality of cutting blades, each with a securing portion to fit into an opening;
- securing means to secure the securing portion of a cutting blade into an opening; and
- a means to attach the first side of the first milling head base to the second side of the second rotary milling head so that the boiler tube end extends through the hole in the first milling head base to the second side of the second rotary milling head.

4. The system of claim 3 wherein the stabilizing means are a mandrel.

5. The system of claim 3 wherein the stabilizing means are adapted to advance the cutting tip to cut the heat transfer fin base.

* * * * *